United States Patent
Ushinsky et al.

(10) Patent No.: US 7,675,952 B2
(45) Date of Patent: Mar. 9, 2010

(54) ARTICULATED GLAZE CLADDING FOR LASER COMPONENTS AND METHOD OF ENCAPSULATION

(75) Inventors: Michael Ushinsky, Irvine, CA (US); Alexander A. Betin, Manhattan Beach, CA (US); Richard Gentilman, Acton, MA (US); Patrick K. Hogan, Arlington, MA (US)

(73) Assignee: Raytheon Company, Waltham, MA (US)

( * ) Notice: Subject to any disclaimer, the term of this patent is extended or adjusted under 35 U.S.C. 154(b) by 713 days.

(21) Appl. No.: 11/021,413

(22) Filed: Dec. 23, 2004

(65) Prior Publication Data

US 2010/0002740 A1 Jan. 7, 2010

(51) Int. Cl.
*H01S 3/14* (2006.01)
*H01S 3/17* (2006.01)
*C03C 8/00* (2006.01)

(52) U.S. Cl. .............. 372/39; 372/40; 501/14
(58) Field of Classification Search ............ 372/39–40; 428/26; 501/14
See application file for complete search history.

(56) References Cited

U.S. PATENT DOCUMENTS

| | | | |
|---|---|---|---|
| 3,882,415 A | | 5/1975 | Cooley |
| 3,988,697 A | * | 10/1976 | Cooley ................ 372/67 |
| 3,993,844 A | * | 11/1976 | Kiger et al. ............ 428/428 |
| 4,103,063 A | * | 7/1978 | Hulse ................ 416/241 B |
| 4,217,382 A | | 8/1980 | Toratani |
| 4,849,036 A | | 7/1989 | Powell et al. |
| 5,508,235 A | * | 4/1996 | Marker .................. 501/7 |
| 5,718,979 A | * | 2/1998 | Marker et al. ............ 428/426 |
| 5,846,638 A | | 12/1998 | Meissner et al. |
| 5,852,622 A | * | 12/1998 | Meissner et al. ............ 372/39 |
| 5,974,061 A | | 10/1999 | Byren et al. |
| 6,304,383 B1 | | 10/2001 | DeBoynton et al. |
| 6,454,465 B1 | | 9/2002 | Uschitsky et al. |

(Continued)

FOREIGN PATENT DOCUMENTS

EP     1 713 149 A1     3/2006

OTHER PUBLICATIONS

Ushitskii M. U. & Karakozov E.S., Calculating some of the parameters of the pressure welding of tubes. Paton Welding Journal (Automatic Welding), 1977, No. 1, pp. 10-12.

(Continued)

*Primary Examiner*—Minsun Harvey
*Assistant Examiner*—Phillip Nguyen
(74) *Attorney, Agent, or Firm*—Leonard A. Alkov

(57) ABSTRACT

A glaze encapsulated solid-state laser component. The novel laser component includes a core and a cladding of ceramic glaze disposed on a surface of the core. In an illustrative embodiment, the core is fabricated from a laser gain medium and the cladding material is a multi-oxide eutectic ceramic glaze having a refractivity slighter lower than the refractivity of the gain medium, such that the glaze layer forms a step-index refractivity interface cladding that can effectively suppress parasitic oscillations in the core gain medium. The glaze cladding can be applied by coating the core with the glaze and then firing the glaze coated core, or by fabricating pre-formed cladding strips from the ceramic glaze in a first firing cycle, mounting the pre-formed strips to the core, and then fusing the pre-formed strips to the core in a secondary firing cycle.

32 Claims, 1 Drawing Sheet

U.S. PATENT DOCUMENTS

| | | | |
|---|---|---|---|
| 6,587,488 B1 | 7/2003 | Meissner et al. | |
| 6,844,797 B2* | 1/2005 | Kido et al. | 333/219.1 |
| 7,085,304 B2* | 8/2006 | Vetrovec | 372/107 |
| 2002/0080841 A1* | 6/2002 | Yin et al. | 372/75 |
| 2002/0110164 A1* | 8/2002 | Vetrovec | 372/36 |
| 2002/0126715 A1* | 9/2002 | Gerstenberger et al. | 372/22 |
| 2003/0214993 A1* | 11/2003 | Baker | 372/92 |

OTHER PUBLICATIONS

Ushitskii M.U. & Karakozov E.S., Development of contact during pressure welding using thermal stresses. Paton Welding Journal (Automatic Welding), 1979, No. 7, pp. 31-34.

Fujitysu S., et al.,Joining of Single-Crystal Sapphire to Alumina Using Silicate Glasses, Journal of the Ceramic Society of Japan, 2003, 111, [7], pp. 448-451.

Kronberg T., Modeling and Optimization of Glaze Properties. Glazes and New Glazing Techniques, Tampere, 2002.

S.P. Timoshenko, Analysis of bi-material thermostats, Journal of the Optical Society of America, 1925, No. 3, pp. 233-255.

E. Suhir, Predicted thermally induced stresses in, and the bow of, a circular substrate/thin film structure, Journal of Applied Physics, vol. 88, No. 5, pp. 2363.

Ushitskii, M.U. and Karakozov, E.S., Development of Physical Contact During Diffusion Welding, with Programmed Application of the Deforming Load, Moscow Evening Metallurgical Institute, Avt. Svarka, 1978, No. 5, pp. 17-20 and p. 28.

Meissner H E et al: "Edge-Cladding glasses for solid-state laser garnet crystals" Journal of Applied Physics USA vol. 62, No. 1 Oct. 1987. 2646-2650, XP002405754.

Bennett R B et al: "Progress in claddings for laser glasses" 1977 Nat. Bur. Standards Washington DC 1977, pp. 434-439 XP001247855, whole document.

* cited by examiner

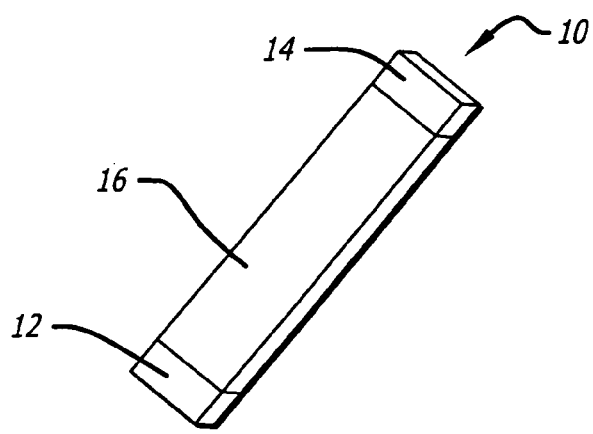
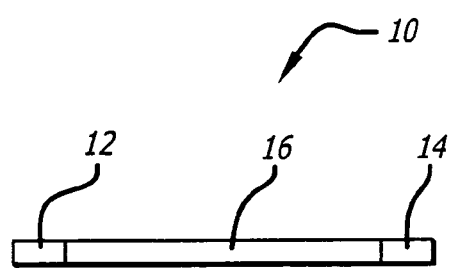
FIG. 1A
(Prior Art)
FIG. 1B
(Prior Art)
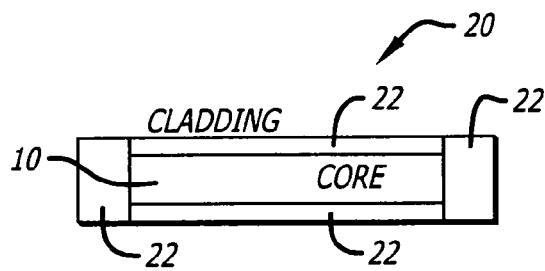
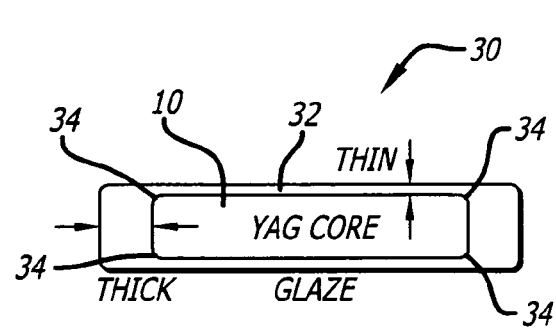
FIG. 2
(Prior Art)
FIG. 3
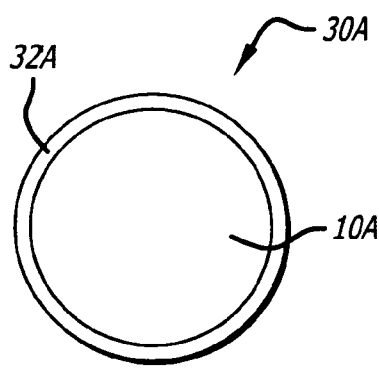
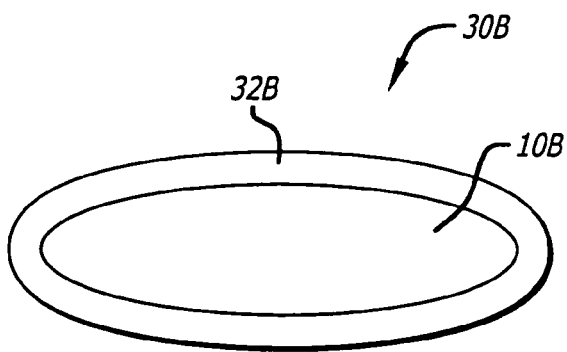
FIG. 4A
FIG. 4B

ARTICULATED GLAZE CLADDING FOR LASER COMPONENTS AND METHOD OF ENCAPSULATION

BACKGROUND OF THE INVENTION

1. Field of the Invention

The present invention relates to solid-state laser technology. More specifically, the present invention relates to cladding techniques and materials for suppression of parasitic oscillations in solid-state laser oscillators and amplifiers.

2. Description of the Related Art

Recent advances in high-energy diode-pumped solid-state lasers have facilitated extensive developments in the architecture of laser components such as laserable slabs and rods. Solid-state laser slabs typically-include a thin planar solid-state gain medium (core plate) that is encapsulated by a solid crystal cladding. The core plate, primarily having a rectangular cross-section, is a key laser component affecting beam quality at high energy levels. Commercial laser slabs are typically comprised of single crystals, such as Yb:YAG (ytterbium doped yttrium-aluminum-garnet) and Nd:YAG (neodymium doped yttrium-aluminum-garnet), or nanocrystalline transparent ceramics, such as $Y_3Al_5O_{12}$. The core plate often includes two undoped input and output sections bonded to a doped central section. The bonded core is then structurally integrated with a peripheral crystal plate cladding. The plate cladding, having a step-index refractivity interface with the core, suppresses parasitic oscillations that otherwise extract energy from the core gain medium.

Parasitic oscillations reduce the efficiency of a solid-state laser system by establishing undesirable and uncontrolled paths of laser oscillations that extract energy from the system. During optical pumping, some of the excited atoms of the active lasing entity will spontaneously decay, resulting in the emission of photons at the frequency of the laser transition. As these photons traverse the solid-state lasing media, they become amplified. If the photons generated by spontaneous decay are emitted at angles greater than the critical angle for total internal reflection; the photons become trapped and will travel through the solid-state laser material by total internal reflection until they reach the edge of the solid-state material. At the edge, these amplified spontaneous emissions can be totally or partially reflected back into the solid-state laser material. If the signal gain achieved by these photons in traversing the solid-state material exceeds the reflection losses at the edge, the process can proceed indefinitely, resulting in the effect known as parasitic oscillation.

A number of methods are known which have been partially successful in reducing parasitic oscillations. Internal reflections can be avoided by roughening the outer surfaces of the laser slab. However, light scattering caused by the crystal roughening substantially reduces the projected slab efficiency. Wedged surfaces on the laser slabs can be designed to reduce parasitics due to; internal reflections on polished surfaces.

While this method provides a partially satisfactory solution, it rarely eliminates parasitics completely because it is difficult to design angled surfaces that will not allow any stray laser radiation to find a closed path within the lasing medium. In addition, the fabrication of precisely wedged core plates of high planarity from the hard-to-machine YAG is a time-consuming and expensive technology. Another prior art method for reducing parasitic oscillations includes depositing evanescent thick coatings having a lowered refractive index on the laser slab. The major technological difficulties associated with this approach are lattice and thermal (CTE) mismatches of the deposited (e.g., sapphire) and core (YAG) materials. This can also lead to energy leaks at the slab edges.

A prior technique for controlling parasitic oscillations is to attach absorptive edge claddings to the laser slab. The cladding is designed to absorb the accumulated spontaneous emissions instead of reflecting and scattering the emissions, thereby preventing the occurrence of parasitic oscillation. The properly designed cladding can also manage (sink) heat fluxes in preferable directions. The cladding, typically comprised of solid sapphire plates for a YAG core plate, is attached to the core plate using conventional diffusion bonding. Thermal and lattice mismatches, however, make the diffusion bonding of sapphire plate cladding with the YAG core plate difficult and lead to imperfect and low strength interface formation with strong propensity to delamination, thermal stresses highly localized at the slab ends, thermal stresses concentrated at reflectors, reduced thermal conductivity at the imperfect interface, and energy leaks. In addition, the machining of sapphire cladding is a time-consuming and expensive process. Thus, all these methods for reducing parasitic oscillations have been used with some degree of success but have not been found to be entirely satisfactory for certain current more demanding applications.

Hence, a need exists in the art for an improved system or method for reducing parasitic oscillations in solid-state laser components that is more effective and easier to fabricate than conventional approaches.

SUMMARY OF THE INVENTION

The need in the art is addressed by the glaze encapsulated solid-state laser component of the present invention. The novel laser component includes a core and a cladding of ceramic glaze disposed on a surface of the core. In an illustrative embodiment, the core is fabricated from a laser gain medium and the cladding material is a multi-oxide eutectic ceramic glaze having a refractivity slighter lower than the refractivity of the gain medium, such that the glaze layer forms a step-index refractivity interface cladding that can effectively suppress parasitic oscillations in the core gain medium. The glaze cladding can be applied by coating the core with the glaze and then firing the glaze coated core, or by fabricating pre-formed cladding strips from the ceramic glaze in a first firing cycle, mounting the pre-formed strips to the core, and then fusing the pre-formed strips to the core in a secondary firing cycle.

BRIEF DESCRIPTION OF THE DRAWINGS

FIG. 1a is a perspective view of a conventional laser gain medium plate, comprised of a thin core plate having a rectangular cross-section and including two undoped input and output sections and a doped central section.

FIG. 1b is a side view of the conventional laser gain medium plate of FIG. 1a.

FIG. 2 is a cross-sectional view of a conventional laser slab with plate cladding.

FIG. 3 is a cross-sectional view of a glaze encapsulated laser slab designed in accordance with an illustrative embodiment of the present teachings.

FIG. 4a is a cross-sectional view of a laser slab (or rod) having a circular cross-section core and encapsulating glaze cladding designed in accordance with an illustrative embodiment of the present teachings.

FIG. 4b is a cross-sectional view of a laser slab (or rod) having an elliptical cross-section core and encapsulating glaze cladding designed in accordance with an illustrative embodiment of the present teachings.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1a is a perspective view of a conventional laser gain medium plate 10, and FIG. 1b is a side view of the conventional laser gain medium plate 10 of FIG. 1a. The laser gain medium plate 10 is comprised of a thin core plate having a rectangular cross-section and including two undoped input and output sections 12 and 14 and a doped central section 16. The core (solid-state gain medium) can be made from single crystals such as Yb:YAG and Nd:YAG, or from similar non-linear nano-crystalline and fully transparent ceramics. Diffusion bonding is typically used to bond these sections.

Conventional diffusion bonding of core components includes placing the joining crystal or nano-ceramic units in intimate contact and applying external pressure and heat, so the units can be bonded together uniformly throughout. High temperature bonding of crystals and ceramics is typically performed in a vacuum, inert gas, or air environment. The pressure and temperature can be constant or variable, including various programmable cycles. Various pressurization techniques include "hot presses", hydrostatic systems, statically indeterminate systems developing intrinsic thermal stresses when heated, and the van der Vaals force-assisted optical contacting. All these methods, as well as precision grinding and polishing, are commonly used in the fabrication of core components.

FIG. 2 is a cross-sectional view of a laser slab 20 with conventional plate cladding. The laser slab 20 includes a Yb:YAG/YAG crystal composite core plate 10 that is peripherally encapsulated by solid sapphire cladding plates 22. The cladding plates 22 are attached to the core plate 10 using conventional diffusion bonding.

Table 1 correlates the major properties of sapphire and YAG. As is evident from this table, the refractivity difference between YAG and sapphire ($n_1 - n_2 = 0.065$) forms a peripheral step-index refractivity interface cladding. With the high thermal conductivity of sapphire, the composite slab 20 well manages the heat fluxes in the gain medium. However, the diffusion bonding of thermally (CTE) and lattice mismatched YAG and sapphire meets enormous difficulties. The shown CTE mismatch and a high temperature processing (~1200-1700° C.), as well as the high elastic moduli of sapphire and YAG ($E^* = 310$ GPa & $E^{**} = 400$ GPa) result in high interfacial thermal stresses. The stresses are localized at the slab ends. The crystal dissimilarity (hexagonal vs. cubic) and lattice mismatch (12.01 A° vs. 12.97 A° and 12.01 A° vs. 4.75 A°) between sapphire and YAG substantially complicate the solid phase interaction between the dissimilar crystals. Even with the relatively close melting temperatures of sapphire and YAG (2030° C. vs. 1970° C.), this cladding method has not been found to be entirely satisfactory.

TABLE 1

| Sapphire | YAG, Yb-doped |
|---|---|
| Crystal symmetry: hexagonal | Crystal symmetry: cubic |
| Lattice constants: a = 4.75 A, c = 12.97 | Lattice constant: a = 12.01 A |
| Transparent at 0.18-4.5 microns | Transparent at 0.18-4.5 microns |
| Density = 3.98 g/cm3 | Density = 4.56 g/cm3 |
| Hardness (Mohs): 8.5-9 | Hardness (Mohs): 8.25-8.5 |
| Thermal conductivity: k = 40 W/m/K | Thermal conductivity: k = 14 W/m/K (@T = 20° C.) and k = 10.5 W/m/K (@T = 100° C.) |
| Melting point T* = 2030° C. | Melting point T* = 1970° C. |
| CTE = 8-8.7 10-6/K (Over. = 8.4) | CTE = 7.8 10-6/K (al) |
| Refractive index@1.0 μm: $n_2$= 1.755 | Refractive index@1.0 μm: $n_1$ = 1.82 |

FIG. 3 is a cross-sectional view of a glaze encapsulated laser slab 30 designed in accordance with an illustrative embodiment of the present teachings. The novel laser slab 30 includes a core plate 10 encapsulated by a glaze coating 32. The glaze layer 32 forms a peripheral step-index refractivity interface cladding that can effectively suppress parasitic oscillations in the core gain medium. In the illustrative embodiment, the core plate 10 is comprised of a Yb:YAG/YAG crystal composite with two undoped input and output sections and a doped central section, similar to that shown in FIGS. 1a and 1b. The invention, however, is not limited thereto. Other types of gain media cores (including crystal, glass, or nano-ceramic), with or without undoped end sections, can also be used without departing from the scope of the present teachings.

In accordance with the teachings of the present invention, the laser slab 30 uses a multi-component eutectic oxide ceramic glaze as the cladding material. Eutectic ceramic glazes are a commonly available and inexpensive material used primarily for pottery and electronics applications. They have not previously been considered for use in lasers or optical systems. Glaze manufacturers therefore typically do not list the optical characteristics such as refractivity and light absorption of the glazes. One of ordinary skill in the art, however, can experimentally determine the optical characteristics of a glaze.

The selected glaze should have: 1) a desirable and predicted refractivity that is slightly less than the refractivity of the core medium, such that the glaze cladding forms a step-index refractivity interface with the core; 2) low light absorption for both pump and signal wavelengths; 3) close thermal (CTE) compatibility with the core materials (not exceeding $0.5 \cdot 10^{-6\circ}$ $C.^{-1}$); 4) desirable thermal conductivity (greater than 1 W/mK) and diffusivity; 5) low to moderate fusion temperatures (as compared with the melting point of the core material) that are correlated with the temperatures of diffusion bonding for the core materials and prevent delamination of the diffusion bonded core components; and 6) surface texture providing predictive diffusive scattering. Among several others, the Pb—Si—Al, Pb—B—Si—Al, and Bi—B—Zn multi-oxide eutectic glaze families, for example, satisfy these criteria and are compatible with Yb:YAG and/or Nd:YAG crystals.

Table 2 correlates overall properties of electronic grade commercial glazes (primarily from manufacturers Ferro and NEG) with the properties of Yb:YAG. When the listed properties of glazes are compared with the properties of sapphire (see Table 1), it is apparent that the eutectic ceramic glazes can successfully replace the sapphire crystal cladding. When compared to similar glasses, the eutectic oxide glazes have substantially lowered melting temperatures. In the case of alumo-silicate low-temperature eutectics, the difference in their melting (fusion) temperatures is about 700° C.

TABLE 2

| Pb—Si—Al, Pb—B—Si—Al, & Bi—B—Zn Commercial Glazes | YAG, Yb-doped crystals |
|---|---|
| Vitreous/polycrystalline ceramics | Crystal symmetry: cubic |
| Lattice parameters: n/a | Lattice constant: a = 12.01 A |
| Transparent at 0.18-4.5 microns | Transparent at 0.18-4.5 microns |
| Density = 2.8-3 g/cm3 | Density = 4.56 g/cm3 |
| Hardness (Mohs): 7.5-8.0 | Hardness (Mohs): 8.25-8.5 |
| Thermal conductivity: | Thermal conductivity: k = |
| k = 1.5-3 W/m/K (@T = 20° C.) | 14 W/m/K (@T = 20° C.) and k = 10.5 W/m/K (@T = 100° C.) |
| Fusion point T* = 550-900° C. | Melting point T* = 1970° C. |
| CTE = 7-9 10-6/K (Over. = 8.4) | CTE = 7.8 10-6/K (al) |
| Refractive index@1.0 μm 1.7-1.82 | Refractive index@1.0 μm 1.82 |

Among other benefits of the multi-oxide eutectic ceramics is the possibility to optimize commercial glazes and, therefore, their properties, primarily their refractivity and thermal expansion. By understanding why different oxides have certain properties, specialists experienced in the field of ceramics will be able to select the proper commercial glaze and modify its refractivity and linear expansion for a desired slab design and firing cycle.

The thickness of the glaze cladding can be constant or variable. In one embodiment, the top, bottom, and lateral thicknesses of the glaze cladding are varied to effectively manage heat fluxes in preferable directions. In the illustrative embodiment of FIG. 3, the thickness of the top and bottom glaze layers is small (nominally 10-20 μm), thereby providing an effective heat sink for the laserable core in the cross-plane direction, while the side claddings are much thicker (nominally 200-1000 μm) to form an insulating layer for the heat flux propagating in the in-plane direction. External cooling devices and thermal interface materials can then be applied to the top and/or bottom of the laser slab to help cool the system.

In a preferred embodiment, as shown in FIG. 3, the core plate 10 is fabricated with rounded fillets (having a radius of R<50 microns) in the corners 34 in order to reduce the stress concentration in the vicinity of the slab corners. The peripheral glaze cladding 32 replicates the shape of the rounded core plate 10.

Laser slabs for high-energy applications typically have a rectangular cross-section, as shown in FIG. 3. The invention, however, is not limited thereto. Other shapes can also be used without departing from the present teachings. For example, FIG. 4a is a cross-sectional view of a laser slab (or rod) 30A having a circular cross-section core 10A and encapsulating glaze cladding 32A designed in accordance with an illustrative embodiment of the present teachings, and FIG. 4b is a cross-sectional view of a laser slab (or rod) 30B having an elliptical cross-section core 10B and encapsulating glaze cladding 32B designed in accordance with an illustrative embodiment of the present teachings.

The present invention also provides an innovative encapsulating technique for laser slabs. First, the components of the core plate 10 (the doped central section 16 and undoped input and output sections 12 and 14, as shown in FIGS. 1a and 1b) are bonded together using diffusion bonding or any other suitable method. The bonded composite core plate is then coated with a eutectic oxide ceramic glaze of predetermined refractivity, light absorption, thermal expansion, thermal conductivity and diffusivity, melting temperature and thickness. Any suitable method can be used to apply the glaze to the core plate. For example, the glaze-based water suspension (slurry) can be applied using syringes, or the core plate (with masked end faces) can be dipped into the glaze slurry. The glaze-coated slab is then fired at a temperature appropriate for the chosen glaze material. As shown in Table 2, eutectic glazes allow processing at relatively low temperatures (about 500-900° C.), significantly lower than the melting point of the gain medium (1970° C. for YAG). Higher temperature processes (required by some prior art cladding techniques) that exceed 80% of the melting point can induce haze or otherwise damage the core crystal.

An alternate method for attaching the glaze cladding to the core plate involves the use of pre-formed glaze cladding plates. The selected glaze can be pre-fired and machined into cladding strips or plates of the desired thickness. The pre-formed cladding strips are then mounted on the core plate and then fused to the laser crystal through a secondary firing cycle. Since the glaze has been pre-melted to form cladding strips, re-melting them requires less energy and lower temperatures. In contrast to crystalline raw oxides that melt suddenly, the pre-melted glazes soften over a range of temperatures. The melting temperature of the secondary cycle can therefore be reduced. This leads to the reduction of mismatch stress and prevents fracturing of the bonded composite crystals. With the pre-molten cladding strips there is no need for high flow, complete coverage, and high temperature soaking. This can result in a lowered temperature re-melting and bonding cycle with substantial risk reduction.

Eutectic glazes are typically powdered mixes of three to four oxides, alkalis, etc. The first stage of glazing is a fritting that typically includes a) mixing of the powdered oxides, b) melting, c) quenching in cold water, and d) grinding into a fine powder. The raw glaze often does not mix well to form an evenly dispersed multi-oxide powder. The fritting employs only mechanical mixing to assure homogeneity of the glaze cladding layer. The dissolution and much localized migration can also affect the homogeneity of the cladding. With the above re-melting step, even at the lowered fusion temperature, the homogeneity of the re-processed glaze improves its refractivity and reduces its light absorption.

In addition, with the suggested cladding pre-forms and the lower temperature re-melting, there may be some reduction in the devitrification of the glaze when cooling, as well as reduction in hairline cracking (dunting) and crazing (if any).

In another embodiment of the invention, the glaze cladding is used in combination with evanescent (such as sapphire) coating(s). This design option includes relatively thick (up to 0.5 mm) side glaze claddings, and evanescent films (having a nominal thickness of about 2.5-3 microns) deposited on the top and bottom of the core plate. In addition to suppressing parasitic oscillations, the side glaze claddings, having moderate to low thermal conductivity, form an insulating layer for the heat flux propagating in the in-plane direction. The thermally conductive evanescent coating(s) provide an effective heat sink for the laserable core in the cross-plane direction. In this case, the glaze cladding, typically having higher fusion temperatures (550-900° C.) than the temperatures of the film deposition (250-300° C.), should be deposited first and the deposition of the evanescent coating(s) completes the encapsulation process.

Another embodiment of the invention is associated with the application of glazes having a controlled and limited (say, less than 0.5 $10^{-6°}$ $C.^{-1}$) thermal (CTE) mismatch with the core material, so the coated crystal is slightly pre-stressed. When operated, the light absorbance leads to elevated temperatures. The temperatures induce thermal stresses that compensate the suggested pre-stressing of the glaze coated laser slab. The details of the pre-stressing and selection of the appropriate glaze are apparent to those skilled in the art of thermo-elasticity.

In another embodiment of the invention, the glaze layer of variable thickness can form reflector prisms that are attached to the core plate. Two glazes having different refractivity can be used to form the reflector prism and the encapsulating cladding. Both single and dual-step firing processes are applicable in the suggested fabrication. The details of the component mounting, fixture (retaining walls), glaze application, etc. are apparent to those skilled in the art of glaze processing.

Thus, the present invention has been described herein with reference to a particular embodiment for a particular application. Those having ordinary skill in the art and access to the present teachings will recognize additional modifications, applications and embodiments within the scope thereof. For example, while the invention has been described with reference to glazes encapsulating Yb:YAG/YAG composite crystals, the invention is not limited thereto. Various glaze cladding materials, design configurations, and encapsulation (deposition) techniques are also considered within the scope of the present invention and can be used for other crystal or nano-ceramic gain media cores.

It is therefore intended by the appended claims to cover any and all such applications, modifications and embodiments within the scope of the present invention.

Accordingly,

What is claimed is:

1. A solid-state laser component comprising:
   a core of yttrium-aluminum-garnet crystal and
   a cladding of ceramic glaze disposed on a surface of said core, said glaze being a eutectic glaze.
2. The invention of claim 1 wherein said glaze is a multi-oxide glaze.
3. The invention of claim 1 wherein said core is fabricated from a laser gain medium.
4. The invention of claim 3 wherein said glaze has a refractivity slightly less than a refractivity of said gain medium, such that said cladding forms a step-index refractivity interface with said core.
5. The invention of claim 3 wherein said glaze has a close thermal compatibility with said gain medium.
6. The invention of claim 1 wherein said glaze has low to moderate fusion temperatures.
7. The invention of claim 1 wherein said glaze has a surface texture providing predictive diffusive scattering.
8. The invention of claim 3 wherein said glaze has low light absorption for pump and signal wavelengths of said gain medium.
9. The invention of claim 1 wherein said glaze cladding has thicknesses varied to effectively manage heat fluxes in preferable directions.
10. The invention of claim 1 wherein said core is in the form of a thin plate having a rectangular cross-section.
11. The invention of claim 1 wherein said core has rounded fillets in its corners.
12. The invention of claim 1 wherein said glaze cladding is thin at a top surface and a bottom surface of said core to provide an effective heat sink.
13. The invention of claim 1 wherein said glaze cladding is thick at side surfaces of said core to form an insulating layer.
14. The invention of claim 1 wherein said core includes a doped central section and two undoped input and output sections.
15. The invention of claim 3 wherein said glaze has a controlled and limited thermal mismatch with said gain medium such that said laser component is slightly pre-stressed.
16. A solid-state laser component comprising:
    a core of yttrium-aluminum-garnet crystal and
    a cladding of a eutectic ceramic glaze disposed on a surface of said core, said glaze having a refractivity slightly less than a refractivity of said gain medium, such that said cladding forms a step-index refractivity interface with said core.
17. The invention of claim 16 wherein said glaze is a multi-oxide glaze.
18. The invention of claim 16 wherein said glaze is a eutectic glaze.
19. The invention of claim 16 wherein said core is fabricated from a laser gain medium.
20. The invention of claim 16 wherein said glaze has a close thermal compatibility with said gain medium.
21. The invention of claim 16 wherein said glaze has low to moderate fusion temperatures.
22. The invention of claim 16 wherein said glaze has a surface texture providing predictive diffusive scattering.
23. The invention of claim 16 wherein said glaze has low light absorption for pump and signal wavelengths of said gain medium.
24. The invention of claim 16 wherein said glaze cladding has thicknesses varied to effectively manage heat fluxes in preferable directions.
25. The invention of claim 16 wherein said core is in the form of a thin plate having a rectangular cross-section.
26. The invention of claim 16 wherein said glaze cladding is thin at a top surface and a bottom surface of said core to provide an effective heat sink.
27. The invention of claim 16 wherein said glaze cladding is thick at side surfaces of said core to form an insulating layer.
28. The invention of claim 16 wherein said core includes a doped central section and two undoped input and output sections.
29. The invention of claim 16 wherein said glaze has a controlled and limited thermal mismatch with said gain medium such that said laser component is slightly pre-stressed.
30. The invention of claim 1 wherein said ceramic glaze has a eutectic composition including lead, silica, and alumina.
31. The invention of claim 1 wherein said ceramic glaze has a eutectic composition including lead, boron, silica, and alumina.
32. The invention of claim 1 wherein said ceramic glaze has a eutectic composition including bismuth, boron, and zinc.

* * * * *